J. W. DOUGLAS.

CONSTRUCTION OF PUMP-GEARING.

No. 7,199. Reissued July 4, 1876.

Joseph W Douglas
INVENTOR

WITNESSES
Jno. M. Douglas
P Douglas Jr

C B Gale ATTORNEY.

N. PETERS, PHOTO-LITHOGRAPHER, WASHINGTON, D. C.

UNITED STATES PATENT OFFICE.

JOSEPH W. DOUGLAS, OF MIDDLETOWN, CONNECTICUT, ASSIGNOR TO W. & B. DOUGLAS.

IMPROVEMENT IN CONSTRUCTION OF PUMP-GEARING.

Specification forming part of Letters Patent No. 151,364, dated May 26, 1874; reissue No. 7,199, dated July 4, 1876; application filed January 28, 1876.

*To all whom it may concern:*

Be it known that I, JOSEPH W. DOUGLAS, of Middletown, county of Middlesex, and State of Connecticut, have made a new and improved construction of a device for attaching and removing the gearing of a pump from the gearing-chamber of a common lifting-pump; and I hereby declare that the following is a full and sufficient description, reference being had to the accompanying drawings, which make part of the description.

It is known that the gearing of a pump consists of the brake or pump-handle; the shaft or pin that extends horizontally from side to side of the pump-cylinder; the rock-shaft, which, in the present case, consists of a horizontal lever-arm, and the pin or shaft, cast in one piece, and the outer end of the lever-arm being also attached to the piston-rod, so that the lever-arm and piston-rod rise and fall together. This is the ordinary pump-gear, but does not describe the devices claimed herein.

Figure 1:
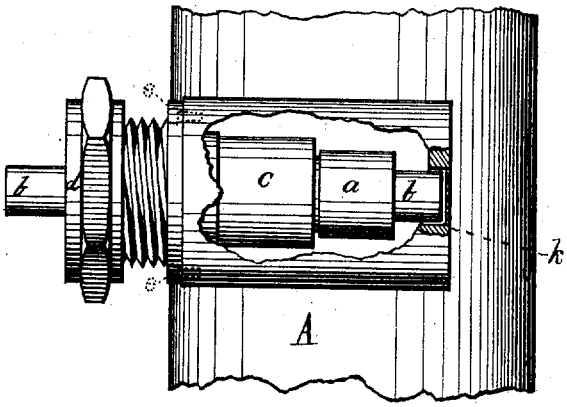

To point out what the invention is, let Figure 1 represent an elevation of the pump-gear, showing shaft *b*, end view of lever-arm *a*, side view of gland-box *c*, also gland *d*, which last two constitute the fastenings of the gear.

Figure 2:
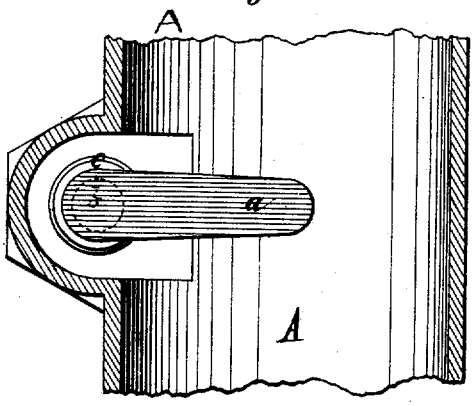

Fig. 2 represents a sectional elevation of the cylinder A, and a side view of lever-arm *a* of the rock-shaft *a b*.

Figure 3:
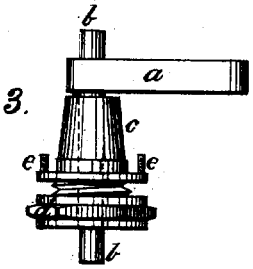

Fig. 3 represents a view of the gearing separate from the pump-cylinder, showing shaft *b* in the vertical position, having brake end downward. In this figure, also, is the compound device of fastening the gearing—namely, the gland-box *c* and the gland *d*, each made of short metallic tube or thimble. The smaller one is screwed into the larger one, and this double tube is just large enough to be received into the shaft-hole in the pump-cylinder at the brake end of the shaft, where the screw of gland *d* is shown with the screw partly loosened, to show its connection with the gland-box *c*, which is already prepared to be screwed, by its screws *e e*, on the flange to the outside of the cylinder, as indicated in Fig. 3, where the screws hang on the flange. Thus the gland *d* and the gland-box *c* constitute the means of fastening the gearing and unfastening in the gear-chamber, and, so far as known to this inventor, they are the only outside fasteners to be used for this purpose.

Now, it is possible that, by long use of the gland *d*, the rubbing of the shaft *b* against the inner face of the gland *d* may loosen the gland, and so become troublesome. Should such defect at any time appear, the remedy for the defect will be found in substituting a left-hand screw in the gland for the right screw here shown. Here every turn of brake tightens the screw. Now, turning the eye to Fig. 1, we see the farther end of the shaft *b* resting in its bearing *k*, while the brake end of shaft *b* rests on its bearing in the gland *d*, while the lever-arm of the rock-shaft is only seen endwise at *a*, where the outer end of the lever-arm is attached to top of the piston-rod.

Now, supposing we wish to remove the fastenings, we first detach the outer end of lever-arm *a* from piston-rod; we then detach the brake from the brake end of the shaft, unscrew *e e* of gland-box *c* and the screw of *d*, and lay the gland and gland-box one side; grasp the rock-shaft in the right hand, raise end of *b* out of its bearing *k*, and withdraw the shaft and rock-shaft in the direction toward *k*, and leaving the gear-chamber empty, except the upper end of piston-rod. Now, reverse the operation of removal, and we have the gearing restored to the gear-chamber, and in working order.

What I claim as my invention is—

1. The combination of the pump-gearing with an outside fastening.

2. The mutual combination of the gland *d* and gland-box *c*, as an outside fastening of pump-gear, as described.

JOSEPH W. DOUGLAS.

Witnesses:

JNO. M. DOUGLAS,

B. DOUGLAS, Jr.